United States Patent [19]

Buchwalter et al.

[11] 4,198,331

[45] Apr. 15, 1980

[54] RESINOUS COATING COMPOSITIONS CURABLE BY MICHAEL ADDUCT EXCHANGE

[75] Inventors: Stephen L. Buchwalter, Allison Park; Robert D. Jerabek, Glenshaw, both of Pa.; Lee-Pei H. Chou, Hudson, Ohio; Roger M. Christenson, Gibsonia, Pa.

[73] Assignee: PPG Industries, Inc., Pittsburgh, Pa.

[21] Appl. No.: 937,368

[22] Filed: Aug. 28, 1978

[51] Int. Cl.$^2$ .................. C08L 63/10; C08L 77/06; C08L 79/00

[52] U.S. Cl. .................. 260/29.2 EP; 260/18 R; 260/29.2 N; 525/396; 528/120; 528/121; 528/123; 528/288; 528/291; 528/332; 528/335; 528/392; 204/181 C; 525/507

[58] Field of Search ............ 260/29.2 EP, 836, 837 R, 260/18 R, 29.2 N; 528/120, 121, 135, 291, 332, 123, 288, 335, 392

[56] References Cited

U.S. PATENT DOCUMENTS

| | | | |
|---|---|---|---|
| 3,844,916 | 10/1974 | Gaske | 204/159.16 |
| 3,914,165 | 10/1975 | Gaske | 204/159.16 |
| 3,975,251 | 8/1976 | McGinniss | 204/181 |
| 4,020,123 | 4/1977 | Trapasso | 260/837 R |
| 4,096,105 | 6/1978 | McGinniss | 260/29.6 NR |

*Primary Examiner*—Earl A. Nielsen
*Attorney, Agent, or Firm*—William J. Uhl

[57] ABSTRACT

Curable resinous compositions containing primary and/or secondary amine groups which are non-volatile under curing conditions and containing alpha, beta-ethylenically unsaturated moieties in conjugation with carbonyl moieties which are reacted with a primary and/or secondary amine which are volatile under curing conditions are disclosed. The compositions are depositable on a substrate to form films.

13 Claims, No Drawings

RESINOUS COATING COMPOSITIONS CURABLE BY MICHAEL ADDUCT EXCHANGE

CROSS-REFERENCE TO RELATED APPLICATIONS

Reference is made to application Ser. No. 937,386, filed even date herewith, entitled MICHAEL ADDUCTS OF POLYMERIC MATERIALS USEFUL IN COATING APPLICATIONS.

BACKGROUND OF THE INVENTION

1. Field of the Invention

The present invention relates to curable resinous compositions and more particularly relates to curable resinous coating compositions in which the resinous binder cures via a Michael addition reaction.

2. Brief Description of the Prior Art

Resinous coating compositions which cure via a Michael addition reaction are known in the art. Thus, for example, U.S. Pat. No. 3,975,251 to McGinniss discloses cationic electrodepositable compositions comprising an acid-solubilized polyamine resin in combination with polyacrylate curing agents. Upon electrodeposition, the polyamine resin deprotonates exposing primary or secondary amine groups which react via a Michael addition with the polyacrylate to form a cured coating on the cathode.

In such compositions, it is necessary that the polyamine resins be completely neutralized (100 percent or more of the total theoretical neutralization) in order to prevent any premature reaction between an unprotonated polyamine resin and the polyacrylate curing agent in the electrodeposition bath.

The present invention is an improvement over the compositions of U.S. Pat. No. 3,975,251. In the present invention, the alpha, beta-ethylenically unsaturated moieties in conjugatiion with carbonyl moieties are reacted with a primary and/or secondary amine which is volatile under curing conditions. Thus, any premature reaction before cure of the alpha, beta-ethylenically unsaturated moieties in conjugation with carbonyl moieties is avoided. When the compositions are heated to curing temperatures, it is believed the adduct decomposes releasing amine which volatilizes generating alpha, beta-ethylenically unsaturated carbonyls which cure via a Michael addition reaction with non-volatile primary and/or secondary amines present in the composition.

SUMMARY OF THE INVENTION

The present invention provides a curable resinous composition comprising
(A) a polyamine resin containing primary and/or secondary amino groups which is stable under curing conditions, and
(B) a Michael adduct of an organic material containing alpha, beta-ethylenically unsaturated moieties in conjugation with carbonyl moieties reacted with primary and/or secondary amines which is unstable under curing conditions.

The resinous composition can be deposited on a substrate to form a film which is curable at elevated temperatures, that is, 250°–450° F. (121°–232° C.). When heated to curing temperatures, the film cures via what is believed to be a Michael exchange, that is, the Michael adduct (B) decomposes releasing amine and generating alpha, beta-ethylenically unsaturated moieties in conjugation with carbonyl moieties. The film crosslinks via reaction of the non-volatile amino groups in (A) and the generated alpha, beta-ethylenically unsaturated moieties in conjunction with carbonyl moieties in (B).

Besides being in the form of two-component systems in which the stable polyamine resin and the unstable Michael adduct are present as separate components, the resinous composition can also be in the form of a one-component system in which non-volatile and volatile amines are in the same polymer molecule.

The resinous compositions of the present invention are desirable as aqueous-based compositions in which at least part of the amine groups are converted to cationic groups by the addition of acid. Such compositions can be used for cationic electrodeposition.

DETAILED DESCRIPTION

Curable compositions of the present invention can be used in the form of two (or more) component systems in which one of the components is a polyamine resin containing primary and/or secondary amino groups which is stable under curing conditions and the second component which is an organic material containing at least two alpha, beta-ethylenically unsaturated moieties in conjugation with carbonyl moieties blocked with a primary and/or secondary amine which is unstable under curing conditions. By the term stable is meant the polyamine resin will not decompose and the amine groups in the polyamine resin will not volatilize when the resinous composition is deposited as a film and subjected to curing temperatures, for example, 250°–450° F. (121°–232° C.). By the term unstable is meant the Michael adduct will decompose and the amine groups in the Michael adduct will volatilize when the resinous composition is deposited as a film and subjected to curing temperatures of 250°–450° F. (121°–232° C.).

Volatilize means that under curing conditions at least 25 and preferably at least 80 percent by weight of the amine volatilizes. The stability or instability of the reactants and volatility of the amine groups can be determined by depositing the polyamine resin and Michael adduct separately as films, baking the films and measuring the loss of nitrogen as a function of temperature.

Examples of stable polyamine resins containing non-volatile primary and/or secondary amino groups are the poly(amide-amine) resins, amino group-containing acrylic resins, imine-modified acrylic resins, the reaction products of polyepoxides with primary amines and the reaction products of polyepoxides with polyamines containing ketimine blocked primary amine groups which free primary amine groups upon hydrolysis. An example of such a polyamine is the diketimine of diethylenetriamine.

In preparing the polyepoxide-primary amine reaction products, the polyepoxide should be a resinous material having a 1,2-epoxy functionality greater than one. The preferred epoxies are polyglycidyl ethers of polyphenols preferably bisphenols such as Bisphenol A. These can be produced, for example, by etherification of polyphenol with epihalohydrin or dihalohydrin such as epichlorohydrin or dichlorohydrin in the presence of alkali. The polyphenol can be, for example, hydroquinone, 2,2-bis-(4-hydroxyphenyl)propane, 1,1-bis-(4-hydroxyphenyl) ethane, 2-methyl-1,1-bis-(4-hydroxyphenyl)propane, 2,2-bis-(4-hydroxy-3-tertiarybutylphenyl)propane, bis-(2-hydroxynaphthyl)-methane, 1,5-dihydroxy-3-naphthalene or the like. Also oxyalkylated adducts such as ethylene and propylene oxide adducts of polyphenols may be employed.

Another quite useful class of polyepoxides is produced from novolak resins or similar polyphenol resins.

The epoxy-containing polymeric materials such as the preferred polyglycidyl ethers of polyphenols can be further reacted to chain extend and increase their molecular weight. For example, they may be further reacted with active hydrogen-containing materials, which are, of course, different from the polyglycidyl ether of the polyphenols and which are reactive with epoxy groups, such as those containing hydroxyl, thiol, carboxylic acid, primary and secondary amine groups. Preferred chain extenders are organic polyols, preferably polymeric polyols, such as polyester polyols including polylactone polyols. Chain extending of epoxy-containing polymeric materials with polymeric polyols is disclosed in U.S. patent application Ser. No. 788,706, filed Apr. 19, 1977, to Marchetti, Zwack and Jerabek, and assigned to PPG Industries, Inc. The epoxy-containing polymeric materials can also be chain extended with N-heterocyclic-containing materials such as described in U.S. patent application Ser. No. 807,757, filed June 17, 1977, to Bosso and Castellucci, and assigned to PPG Industries, Inc.

Besides the polymers mentioned above, other epoxy-containing polymers can be employed although their use is not preferred. Examples include polyglycidyl ethers of polyhydric alcohols, polyglycidyl esters of polycarboxylic acids and epoxy-containing acrylic polymers. These polymers are described in U.S. Pat. No. 4,001,156 to Bosso and Wismer, the portions of which are hereby incorporated by reference.

The polyepoxide as described above is reacted with a primary amine to form the polyamine resin. Examples of suitable primary amines are monoamines which are preferred such as propyl amine, butyl amine, amyl amine, and ethanolamine. Polyamines such as ethylene diamine and 1,6-hexamethylene diamine can also be used, but they are not preferred because of their tendency to gel the reaction mixture.

The primary amine opens the epoxy to form the secondary amine with a carbon-nitrogen bond which is stable to heat, i.e., the reaction product will not decompose and amine will not be cleaved and volatilize under curing conditions.

In a preferred embodiment for aqueous-based systems, the amine is a polyamine containing ketimine blocked primary amine groups which free primary amine groups upon hydrolysis. Such products can be derived virtually from any polyamine capable of reacting with an epoxy group having, for example, at least one secondary amine group and containing ketimine-blocked primary amine groups. Examples of suitable polyamines are alkylene polyamines and substituted alkylene polyamines, such as those having the following formula:

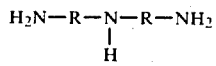

where R is a difunctional aliphatic or aromatic group containing from 2 to 28 carbon atoms. R may be represented by the same or different radicals in any one polyamine compound. Inert or non-interfering groups may be present on the group R. Preferred polyamines are those having the formula set forth above wherein R is an aliphatic hydrocarbon group, more preferably an alkylene group with from 2 to 6 carbon atoms.

Typical of the amines which may be used are diethylene triamine, dipropylene triamine, dibutylene triamine and triethylene tetramine.

The primary amine groups in the polyamine compound are converted to ketimines by reaction with ketones such as acetone, methyl ethyl ketone and methyl isobutyl ketone.

Such reaction products are particularly desirable for use in aqueous based systems. The polyamine reacts with the polyepoxide through the secondary amine group to form the epoxy-amine reaction product. Upon the addition of water, the ketimine groups hydrolyze resulting in the formation of primary amine groups which are available for subsequent crosslinking.

Besides the polyepoxide-amine reaction products, examples of other polyamine resins are poly(amine-amides) including poly (amine-ester-amides) which are prepared by condensation of dicarboxylic acids, polyamines and, if desired, polyols. Examples of dicarboxylic acids are those represented by the structural formula:

where R is a saturated aliphatic hydrocarbon group or aromatic hydrocarbon group having from 0 to 34 carbon atoms. Examples include phthalic acid, malonic acid, succinic acid, azelaic acid, adipic acid, sebacic acid, dimerized fatty acid such as dimerized linolenic acid.

Examples of polyamines are polyalkylene polyamines having primary amino groups at both ends of the amine chain, represented by the general formula:

where $R_1$ is an aliphatic hydrocarbon having from 2 to 6 carbon atoms. Examples of such polyamines are ethylene diamine, propylene diamine, butylene diamine, hexamethylene diamine, tetraethylene pentamine, pentaethylene hexamine, diethylene triamine, triethylene tetramine, bis(3-aminopropyl)-amine, 1,3-bis(3'-aminopropylamino)propane.

Examples of polyols are ethylene glycol, propylene glycol, 1,4-butanediol and diethylene glycol.

For curable compositions, the polyamine resin described above is used in combination with a Michael adduct of an organic material containing alpha, beta-ethylenically unsaturated moieties in conjugation with carbonyl moieties preferably

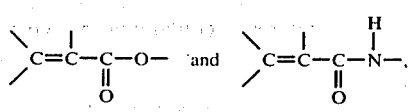

reacted with primary and/or secondary amines; the Michael adduct being unstable under curing conditions. The organic material may be a relatively low molecular weight compound or it may be a relatively high molecular weight resinous material.

Examples of suitable organic materials are polyacrylates or methacrylates having at least two groups of the structure

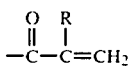

pendantly attached to an organic radical selected from the group consisting of alkyl, aryl, alkyl-aryl and polymeric radicals. In the above structure, R is hydrogen or lower alkyl containing from 1 to 4 carbon atoms such as methyl and ethyl.

The preferred polyacrylate and polymethacrylate compounds are formed from reacting organic polyols with acrylic or methacrylic acid. Examples of suitable compounds include ethylene glycol diacrylate, 1,4-butanediol dimethacrylate, Bisphenol A diacrylate, diethylene glycol diacrylate, pentaerythritol triacrylate, pentaerythritol tetraacrylate, trimethylolpropane triacrylate, Bisphenol A dimethacrylate and polyethylene glycol dimethacrylate.

Besides the polyacrylate and polymethacrylates, examples of other organic materials are the following:

(1) reaction products of polyisocyanates, preferably diisocyanates such as toluene diisocyanate or isocyanate-terminated prepolymers with hydroxyl-containing acrylic and methacrylic esters such as 2-hydroxyethyl acrylate or hydroxypropyl methacrylate;

(2) reaction products of an epoxy resinous material such as those described above with acrylic or methacrylic acid;

(3) transetherification reaction products of polymeric polyols such as hydroxyl-containing acrylic resins, polyester polyols including polyesters derived from lactones and polyether polyols with N-alkoxymethyl acrylamides and methacrylamides.

The amine which is reacted with the organic material containing alpha, beta-ethylenically unsaturated moieties in conjugation with carbonyl moieties to form the Michael adduct is a primary or secondary amine which is volatile under curing conditions. Many primary and secondary amines can be used since the Michael adduct is easily decomposed by heat resulting in the amine being cleaved and volatilized. Examples of suitable amines are those which have a boiling point below 200° C. such as hydrazine, ethanolamine, methyl ethanolamine, piperidine and amylamine. Preferred primary and secondary amines are those boiling below 100° C. such as propylamine, diethylamine and dimethylamine.

The conditions under which the amine and the polymeric materials containing alpha, beta-ethylenically unsaturated moieties in conjugation with carbonyl moieties are reacted are as follows:

To the stirred mixture of the organic material containing alpha, beta-ethylenically unsaturated carbonyl moieties and any desired solvent to reduce viscosity, the amine is added. The reaction temperature is usually about ambient temperature or slightly above (i.e., 50° C.). Cooling may or may not be necessary depending on the exothermic nature of the particular reaction and on the scale on which it is conducted. Following amine addition, reaction is carried to completion by heating at 50°–80° C. for 1 to 2 hours.

Secondary amines are preferred to primary amines because of processing conditions. Primary amines are difunctional and have potential for gelling the reaction mixture. If primary amines are used, precautions should be taken to avoid gelling. For example, excess amine can be used and the excess vacuum stripped at the completion of the reaction. Also, the above-described reaction conditions can be varied such that the polymeric material is added to the amine.

Preferably, the equivalent ratio of polyamine resin to the Michael adduct (equivalent ratio of non-volatile amine to volatile amine) should be 0.1 to 10/1, more preferably 0.5 to 2/1.

It should be pointed out that besides the two-component system described above, a one-component system in which the volatile and non-volatile amine groups are in the same polymer molecule can also be used in the practice of the invention. For example, a polymeric material containing alpha, beta-ethylenically unsaturated moieties in conjugation with carbonyl moieties such as described above can be reacted with a volatile amine such as diethylamine or dimethylamine and a non-volatile amine such as the polyamine-ketimine derivative described above.

The resinous compositions as described above can be used neat or in organic solvent or made water dispersible. Depending on the molecular weight of the various ingredients and the percentage of amine groups, the ingredients may be dispersible as prepared. However, for dispersion in water, it is preferred that at least part of the amine groups be converted to cationic groups to assist in water dispersibility.

Conversion to cationic groups can be done by neutralizing the amine groups with acid. Examples of suitable acids include organic and inorganic acids such as formic acid, acetic acid, lactic acid, phosphoric acid and carbonic acid. It is only necessary that sufficient acid be added to solubilize or disperse the resinous composition in water. Typically, the amount of acid used will be sufficient to provide anywhere from about 30 to 120 percent of the total theoretical neutralization equivalent.

For aqueous-based systems, the percentage of cationic groups, the molecular weight and the structure of the various ingredients in the resinous composition should be coordinated with one another such that when the resinous composition is mixed with an aqueous medium, a stable dispersion will form. A stable dispersion is one which does not sediment or is one which is easily redispersible if some sedimentation occurs. In addition, the dispersion should be of sufficient cationic character that the dispersed particles will migrate towards the cathode when an electrical potential is impressed between an anode and a cathode immersed in the aqueous dispersion. Also, the molecular weight, structure and percentage of cationic groups should be controlled so that the dispersed resinous composition will have the required flow to form a film upon the substrate; in the case of electrodeposition, to form a film upon the cathode. The film should be insensitive to moisture. For cationic electrodeposition, it should be insensitive to moisture to the extent that it will not redissolve in the electrodeposition bath or be rinsed away from the coated cathode after its removal from the bath. The structure, molecular weight and percentage of cationic groups in the various ingredients of the resinous composition are dependent on one another and a selection of one can only be made after a consideration of the other two.

In general, the polyamine resins containing primary and secondary amine groups which are stable under curing conditions will have molecular weights within the range of about 500 to 60,000. Water-dispersible resins will usually contain from about 0.01 to 10 milliequivalents of cationic groups per gram of resin solids.

The Michael adducts will have molecular weights within the range of about 300 to 6,000. Water-dispersible adducts will contain from about 0.01 to 10 milliequivalents of cationic groups per gram of resin solids.

The resinous compositions of the present invention can be used neat, in organic solution or as mentioned above in aqueous dispersions. The term "dispersion" as used within the context of the present invention is believed to be a two-phase, transparent, translucent or opaque aqueous resinous system in which the resin is the dispersed phase and water is the continuous phase. Average particle size diameter of the resinous phase is generally less than 10 and preferably less than 5 microns. The concentration of the resinous phase in the aqueous medium depends upon the particular end use of the dispersion and in general is not critical. For example, the aqueous dispersion preferably contains at least 1 and usually from about 5 to 50 percent by weight resin solids.

Besides water, the aqueous medium may contain a coalescing solvent. The use of coalescing solvent may be, in some instances, for improved film appearance. These solvents include hydrocarbons, alcohols, esters, ethers and ketones. The preferred coalescing solvents include mono-alcohols, glycols and polyols as well as ketones and other alcohols. Specific coalescing solvents include isopropanol, butanol, isophorone, 4-methoxy-2-pentanone, ethylene and propylene glycol, the monoethyl, monobutyl and monohexyl ethers of ethylene glycol and 2-ethylhexanol. The amount of coalescing solvent is not unduly critical and is generally between about 0.01 and 40 percent by weight, preferably about 0.05 to about 25 percent by weight based on total weight of aqueous medium.

In most instances, a pigment composition and, if desired, various additives such as surfactants or wetting agents are included in the dispersion. Pigment composition may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. Pigment content of the dispersion is usually expressed as pigment-to-resin ratio. In the practice of the present invention, the pigment-to-resin ratios are usually within the range of 0.1 to 5:1. The other additives mentioned above are present in the dispersion in amounts of 0.01 to 3 percent by weight based on total weight of resin solids.

When the aqueous dispersions described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The conditions under which electrodeposition is carried out are, in general, similar to those used in electrodeposition of other types of coatings. The applied voltage may be varied and can be, for example, as low as one volt or as high as several thousand volts, but typically between 50 and 500 volts. The current density is usually between 1.0 ampere and 15 amperes per square foot and tends to decrease during electrodeposition indicating the formation of an insulating film.

The curable resinous compositions of the present invention can also be used in other conventional coating applications such as flow, dip, spray and roll coating applications.

For electrodeposition and other conventional coating applications, the coating compositions can be applied to a variety of electroconductive substrates especially metals such as steel, aluminum, copper, magnesium and the like, but also including metallized plastic and conductive carbon-coated materials. For other conventional coating applications, the compositions can be applied to non-metallic substrates such as glass, wood and plastic.

After the coating has been applied by electrocoating or flow coating, it is usually cured by baking at elevated temperatures such as 120° to 235° C. for about 1 to 30 minutes.

Illustrating the invention are the following examples, which, however, are not to be construed as limiting the invention to their details. All parts and percentages in the examples as well as throughout this specification are by weight unless otherwise indicated.

EXAMPLE I

A polyepoxide (polyglycidyl ether of Bisphenol A chain extended with 5,5-dimethyl hydantoin) was defunctionalized with acetic acid to form a polymeric polyol which was then transetherified with N-butoxymethyl acrylamide (NBMA) to form an organic material containing alpha, beta-ethylenically unsaturated moieties in conjugation with carbonyl moieties. The Michael adduct was then prepared by reacting the organic material with aqueous dimethylamine. The charge for preparing the reaction product was as follows:

| Component | Parts by Weight | Solids |
|---|---|---|
| EPON 829[1] | 1390 | 1333 |
| Bisphenol A | 449 | 449 |
| 5,5-dimethyl hydantoin | 95 | 95 |
| triphenyl phosphine catalyst | 2 | 2 |
| glacial acetic acid | 108 | 108 |
| butyl benzyl phthalate | 100 | |
| phenothiazine (free radical inhibitor) | 0.2 | 0.2 |
| para-toluenesulfonic acid (transetherification catalyst) dissolved in ethylene glycol monoethyl ether | 16.8 | 6.8 |
| hydroquinone (free radical inhibitor) dissolved in ethylene glycol monoethyl ether | 22.0 | 7.0 |
| NBMA | 350 | 350 |
| ethylene glycol monobutyl ether | 250 | |
| ethylene glycol monophenyl ether | 200 | |
| methyl ethyl ketone | 300 | |
| aqueous dimethylamine | 251 | 100 |
| deionized water | 150 | |

[1]Polyglycidyl ether of Bisphenol A having a molecular weight of about 380 and an epoxy equivalent weight of about 190 commercially available from Shell Chemical Company.

The EPON 829, Bisphenol A and 5,5-dimethyl hydantoin were added to a reaction vessel under a nitrogen atmosphere and heated to 150° C. to initiate an exotherm. The reaction was allowed to exotherm for about 45 minutes with the highest temperature reaching 220° C. The reaction mixture was cooled to 160° C. and the triphenyl phosphine added followed by the addition of the acetic acid. The reaction mixture was held at a temperature of 150° C. for about six hours. The resin had an acid value of 7 at this point. The butyl benzyl phthalate, phenothiazine and para-toluene sulfonic acid solution were added followed by evacuation of the reaction vessel to about 25 torr. Addition of the NBMA containing the hydroquinone solution was carried out over one hour with the reaction mixture at 130°–135° C. Distillation of n-butanol began 5 minutes after the addition was started and was continued for 1½ hours when it was complete. A total of 177 parts (by volume) of distillate was collected (theory 204 parts) which was 77.4 percent n-butanol according to gas chromatography. Pressure was then increased to atmospheric with nitrogen, and the solvents were added. After cooling to 60° C., the dimethylamine and water were added over 15 minutes. The mixture was then held at 75°–80° C. for 2 hours. The product had an amine equivalent of 1562 (theory 1634) and was 74.4 percent solids.

The Michael adduct prepared as described above was combined with a polyamine resin (VERSAMID 125) and the mixture solubilized with acid and dispersed in deionized water in the following charge:

| Ingredient | Parts by Weight |
| --- | --- |
| Michael adduct (61.5% resin solids) | 326 |
| VERSAMID 125[1] | 38 |
| 80% aqueous lactic acid (76% total theoretical neutralization) | 35.5 |
| deionized water | 1370 |
| 2-ethylhexanol | 15 |

[1]Poly(amine-amide) resin having an amine equivalent of 183, commercially available from General Mills (100% resin solids).

In preparing the dispersion, the lactic acid was dissolved in 120 parts by weight of deionized water and the Michael adduct and the VERSAMID 125 were blended separately in a stainless steel reactor. The blend was then added to the water-lactic acid mixture. The mixture was further diluted with 250 milliliters of deionized water, stirred for 15 minutes and then diluted again with 1000 milliliters of deionized water. A translucent dispersion was obtained which was excellent in appearance being red-brown in color and having a pH of 5.2. The viscosity of the dispersion was somewhat high for electrocoating, but it was found that a small amount of 2-ethylhexanol reduced the viscosity quite effectively.

Untreated steel panels were electrodeposited in this dispersion at 100–120 volts for 90 seconds to give self-insulating films with good appearance. When the films were baked at 350° F. (177° C.) for 30 minutes, hard, dark brown, solvent-resistant films were obtained. Solvent resistance was determined by taking an acetone-saturated cloth and rubbing back and forth across the film surface with normal hand pressure. Forty (40) acetone double rubs were required to soften the film.

EXAMPLE II

A polyamine resin which contains non-volatile primary amine groups was prepared by reacting a polyepoxide (polyglycidyl ether of Bisphenol A) with the methyl isobutyl diketimine of diethylamine triamine. The charge was as follows:

| Ingredients | Parts by Weight |
| --- | --- |
| EPON 1001[1] | 470.0 |
| methyl isobutyl diketimine of diethylene triamine dissolved in methyl isobutyl ketone (73% by weight resin solids) | 373.2 |
| methyl isobutyl ketone | 100 |

[1]Polyglycidyl ether of Bisphenol A having an epoxy equivalent weight of about 470 and a molecular weight of about 940.

The EPON 1001 and diketimine were mixed together in a 1:1 equivalent ratio and stirred until all the EPON 1001 dissolved. The mixture was heated to 100° C. and held for 1 hour, cooled to 50° C. and thinned with the methyl isobutyl ketone. The reaction mixture was heated to 100° C., held for 20 minutes and cooled to room temperature.

The Michael adduct of an organic material containing alpha, beta-ethylenically unsaturated carbonyl moieties was prepared by reacting pentaerythritol triacrylate with diethylamine in the following charge:

| Ingredients | Parts by Weight |
| --- | --- |
| pentaerythritol triacrylate | 314 |
| diethylamine | 241 |

The two ingredients (1:3.3 molar ratio) were mixed together and an exotherm was initiated. The reaction was cooled with an ice bath.

The polyamine resin and the Michael adduct were mixed together to form a curable composition in the following charge:

| Ingredients | Parts by Weight |
| --- | --- |
| polyamine resin (78.8% resin solids) | 23.7 |
| pentaerythritol-diethylamine adduct | 16.8 |

The ingredients were mixed together (0.05:0.1 equivalent ratio) and the mixture coated onto untreated steel substrates by drawing down with a 3-mil drawbar. When the coatings were cured at 350° F. (177° C.) for 15 minutes, hard (6H pencil hardness), solvent-resistant films were obtained. Curing at 350° F. (177° C.) for 10 minutes resulted in softer (2H pencil hardness), less solvent-resistant films. Curing at 300° F. (149° C.) for 40 minutes resulted in even softer (H+ pencil hardness) films which had very poor solvent resistance.

EXAMPLE III

The polyamine resin and Michael adduct of Example II were mixed together and the mixture thinned with various solvents to form a coating composition suitable for spraying. The charge was as follows:

| Ingredients | Parts by Weight |
| --- | --- |
| polyamine resin | 47.5 |
| Michael adduct | 16.9 |
| methyl ethyl ketone | 20 |
| ethylene glycol monobutyl ether | 10 |
| methyl isobutyl ketone | 15 |

The coating composition prepared as described above (equivalent ratio of polyamine resin to Michael adduct 1:1) was sprayed over zinc phosphated steel panels.

When the coating was baked for 20 minutes at 350° F. (177° C.), a glossy film having a thickness of about 1.0 mil was obtained. The baked film had the following properties: 2H pencil hardness, >160 inch-pounds reverse impact resistance, >100 double acetone rubs solvent resistance, >24 hour 5 percent NaOH resistance.

EXAMPLE IV

The polyamine resin and the Michael adduct of Example II (1:1 equivalent ratio) were mixed together and the mixture solubilized with acid and dispersed in water to form a cationic resinous dispersion for use in dip coating. The charge for preparing the dispersion was as follows:

| Ingredients | Parts by Weight |
|---|---|
| polyamine resin | 47.5 |
| Michael adduct | 16.9 |
| acetic acid | 2.8 (23% total theoretical neutralization) |
| deionized water | 332.8 |

The dispersion had a pH of 8.2. An untreated steel panel was dipped in the bath and the coated panels baked at 350° F. (177° C.) for 20 minutes to give films having a thickness of about 0.05 mil. The film did not blush when immersed in boiling water for 15 minutes, and protected the steel from rusting when immersed in distilled water for 24 hours.

EXAMPLE V

This example is similar to Example IV above with the exception that a poly(amine-amide) resin (VERSAMID 125) is used in place of the EPON 1001-diketimine derivative. The charge for preparing the curable resinous composition is as follows:

| Ingredient | Parts by Weight |
|---|---|
| VERSAMID 125 | 18.3 |
| Michael adduct of Example II | 16.8 |

The ingredients (1:1 equivalent ratio) mixed easily and when the mixture was coated on steel panels by drawing down with a drawbar, and the coatings cured at 350° F. (177° C.) for 10 minutes, hard, solvent-resistant films were obtained.

EXAMPLE VI

A polyamine resin containing non-volatile primary amine groups and which is similar to the polyamine resin of Example II was prepared from the following charge:

| Ingredients | Parts by Weight |
|---|---|
| EPON 1004[1] | 1094.9 |
| methyl isobutyl diketimine of diethylene triamine dissolved in methyl isobutyl ketone (73% by weight resin solids) | 578 |
| ethylene glycol monophenyl ether | 300 |

[1]Polyglycidyl ether of Bisphenol A having an epoxy equivalent weight of about 950.

The EPON 1004 and diketimine were mixed and the mixture exothermed to 145° C. The reaction mixture was cooled to 110° C., held for 15 minutes and the ethylene glycol monophenyl ether added followed by cooling to room temperature. The reaction product had a solids content of 74.15 percent and an amine equivalent of 470.

The Michael adduct of an organic material containing alpha, beta-ethylenically unsaturated carbonyl moieties was prepared from reacting the polyacrylate derivative of a styrene-allyl alcohol copolymer with diethyl amine in the following charge:

| Ingredients | Parts by Weight |
|---|---|
| styrene-allyl alcohol copolymer[1] | 567.5 |
| toluene | 200 |
| methanesulfonic acid | 5.7 |
| acrylic acid | 180.2 |
| hydroquinone | 5.7 |
| phenothiazine | 2.3 |
| methanesulfonic acid | 1.8 |
| diethyl amine | 182.5 |

[1]Styrene-allyl alcohol copolymer commercially available from Monsanto Company as RJ 101 with an average molecular weight of 1150 and a hydroxyl value of 222.

The styrene-allyl alcohol copolymer, toluene and methanesulfonic acid were heated to reflux under nitrogen in a reaction vessel equipped with a Dean-Stark trap for collecting water. The mixture of acrylic acid, hydroquinone and phenothiazine was added slowly over three hours as the evolved water was removed via the toluene-water azeotrope. After two hours additional refluxing, 35 parts by volume of water had been removed and the acid value of the reaction mixture was 26. An additional 1.8 parts of methanesulfonic acid was added and reflux was maintained for another hour. The acid value was reduced further by allowing volatile material to evaporate as the temperature cooled from 125° to 96° C. Final acid value was 9.3.

The resin had an unsaturation equivalent of 148 and was 88.4 percent solids. The resin was cooled to 50° C., and diethylamine (amine to unsaturation=0.43:1.0) was added over 40 minutes. Final product had an amine equivalent of 387.

The two ingredients were mixed together, solubilized with acetic acid and dispersed in deionized water in the following charge to form an electrodeposition bath:

| Ingredients | Parts by Weight |
|---|---|
| EPON 1004-diketimine derivative | 80.0 (74.2% solids) |
| styrene-allyl alcohol derivative | 45.0 (86.5% solids) |
| Propasol B[1] | 10.0 |
| acetic acid | 6.86 |
| deionized water | 600 |

[1]Reaction product of butanol and propylene oxide commercially available from Union Carbide.

The dispersion contained 11.9 percent solids, had a pH of 7.1 and the resinous materials were well dispersed.

When steel panels were electrodeposited in this dispersion at voltages over the range of from 50 to 100 volts for 60 seconds, insulating films were deposited. When the coated panels were baked at 350° F. (177° C.) for 15 minutes, solvent-resistant films were obtained which required 60 acetone double rubs to remove the film.

EXAMPLE VII

A polyepoxide (polyglycidyl ether of Bisphenol A) was defunctionalized with nonyl phenol to form a polymeric polyol which was then transetherified with N-butoxymethyl acrylamide (NBMA) to form an organic material containing alpha, beta-ethylenically unsaturated moieties in conjugation with carbonyl moieties. The organic material was then reacted with diethylamine and the methyl isobutyl diketimine of diethylene triamine to form a one-component curable resin. The charge for preparing the organic material was as follows:

| Ingredient | Parts by Weight | Solids |
|---|---|---|
| EPON 829 | 1292 | 1240 |
| Bisphenol A | 528 | 528 |
| nonyl phenol | 450 | 450 |
| ethyl triphenyl phosphonium iodide catalyst (dissolved in ethylene glycol monophenyl ether) | 15 | 1.5 |
| phenothiazine (free radical inhibitor) | 0.2 | 0.2 |
| para-toluene sulfonic acid (transetherification catalyst) dissolved in methyl isobutyl ketone | 8.5 | 3.5 |
| NBMA | 629 | 629 |
| hydroquinone dissolved in ethylene glycol monomethyl ether | 21.0 | 9.0 |
| para-toluene sulfonic acid dissolved in methyl isobutyl ketone | 8.5 | 3.5 |
| ethylene glycol monobutyl ether | 1200 | — |
| ethylene glycol monoethyl ether | 300 | — |

The EPON 829 and Bisphenol A were charged to a reaction vessel under a nitrogen blanket and heated to 160° C. to initiate an exotherm. Following the exotherm, the temperature was maintained at about 150° C. for one hour followed by the addition of the nonyl phenol and 10 parts of the ethyl triphenyl phosphonium iodide catalyst solution. The temperature was maintained at about 153° C. for about 2 hours followed by the addition of the remaining 5 parts of ethyl triphenyl phosphonium iodide catalyst solution.

After two additional hours at 150° C., a sample was removed and found to have an epoxy equivalent of about 7000. The reaction was vacuum stripped to remove any volatile material. The phenothiazine and para-toluene sulfonic acid were then added to the reaction mixture and the pressure was reduced to 15 torr. With the temperature at 145° C., the addition of NBMA containing hydroquinone solution and additional acid catalyst was begun. Within 5 minutes, the distillation of n-butanol was observed. The addition of NBMA was completed in 2½ hours, and the pot temperature dropped to 125° C. during this period. Vacuum distillation of n-butanol continued for 2 hours with the pot temperature increasing slowly to 145° C. The pressure in the vessel was returned to atmospheric with nitrogen, and the product was cooled by the addition of the solvents. The product had an unsaturation equivalent of 917 (theory 1036) and was 69.1 percent solids. During the transetherification, a total of 279 parts of distillate was obtained (theory 296 parts) which was 86.5 percent n-butanol according to gas chromatography.

The polymeric material containing alpha, beta-ethylenically unsaturated carbonyl moieties was reacted with methyl isobutyl diketimine of diethylene triamine and diethylamine to form a one-component curable system. The charge of the reaction mixture was as follows:

| Ingredient | Parts by Weight | Equivalents |
|---|---|---|
| polymeric material (69% resin solids) | 500 | 0.48 |
| methyl isobutyl diketimine of diethylene triamine (dissolved in methyl isobutyl ketone, 73% by weight resin solids) | 72 | 0.19 |
| diethylamine | 21.0 | 0.29 |

The polymeric material was charged to a reaction vessel followed by the simultaneous addition of the diketimine and the diethylamine. An exotherm resulted and after completion of the addition of the amines and subsidence of the exotherm, the reaction mixture was heated to 80° C. and held for about 2 hours. The reaction mixture was then cooled to room temperature.

EXAMPLE VIII

Half (297 parts) of the Michael adduct prepared as described in Example VII was added to a solution of 22.1 parts of lactic acid in 400 parts by weight of deionized water. The resin did not readily disperse. However, on adding an additional 1100 parts by weight of deionized water and 20 parts by weight of lactic acid, the resin dispersed to a translucent brown dispersion. The resin as thinned with an additional 500 parts by weight of deionized water to form an 11 percent solids electrodeposition bath having a pH of about 4.9. When cold rolled untreated steel panels were electrodeposited in this bath and the coated panels cured at a temperature of 350° F. (177° C.) for 30 minutes, hard, solvent-resistant coatings were obtained requiring 60 acetone double rubs to mar the film.

EXAMPLE IX

An epoxy resin, a polyglycidyl ether of Bisphenol A chain extended with poly(neopentyl glycol-adipate) diol, was reacted with acrylic acid to form a polymer containing alpha, beta-ethylenically unsaturated carbonyl moieties. The Michael adduct was prepared by reacting this polymer with dimethylamine. The charge was as follows:

| Ingredient | Parts by Weight | Solids |
|---|---|---|
| EPON 829 | 1389.6 | 1333.3 |
| Bisphenol A | 448.6 | 448.6 |
| poly(neopentyl glycol-adipate) diol (MW = 530) | 380 | 365 |
| TEXANOL | 178 | — |
| benzyl dimethylamine | 6.2 | 6.2 |
| lactic acid | 7.2 | 6.3 |
| phenyl CELLOSOLVE | 462 | — |
| FOAMKILL 639 | 12.0 | 12.0 |
| methyl ethyl ketone | 365 | — |
| phenothiazine | 0.22 | 0.22 |
| 2,6-ditertiarybutyl-4-methyl phenol | 10.9 | 10.9 |
| acrylic acid | 119.5 | 119.5 |
| triphenyl phosphine | 23.0 | 23.0 |
| 40% by weight aqueous dimethylamine | 217.4 | 86.8 |
| methyl ethyl ketone | 400 | — |

Following the procedure of Example I, a chain-extended epoxy resin was obtained having a Gardner-Holdt viscosity of S at 25° C. as a 1:1 mixture with ethylene glycol monoethyl ether. The reaction mixture was reduced with solvent and reacted further with acrylic acid and then dimethylamine. The Michael adduct resin had a final solids content of 60.8 percent.

The Michael adduct was added to a stainless steel beaker containing deionized water and sufficient lactic acid to neutralize 85 percent of the amine functionality. Additional water was then added to reduce the dispersion to 10 percent solids. The charge for preparing the dispersion was as follows:

| Ingredient | Parts by Weight |
|---|---|
| deionized water | 338 |
| 88% by weight aqueous lactic acid | 12.1 |

| Ingredient | Parts by Weight |
|---|---|
| Michael adduct | 329 |
| deionized water | 1333 |

The resin dispersed in an excellent fashion and had a pH of 4.2. Untreated steel panels were electrodeposited in the bath at 300 volts for 90 seconds to produce insulating films. Some of the coated panels were air dried, some were baked at 250° F. (121° C.) for 30 minutes, some were baked at 300° F. (149° C.) for 30 minutes, some were baked at 350° F. (177° C.) for 30 minutes, and some were baked at 400° F. (204° C.) for 30 minutes. The air dried and baked films were then scraped from the panels and analyzed for the percentage by weight nitrogen by a Kjeldahl analysis. The results are presented below.

| Drying or Baking Conditions | Percent Nitrogen |
|---|---|
| Air drying | 0.20 |
| 250° F. (121° C.) bake | 0.07 |
| 300° F. (149° C.) bake | no nitrogen detected |
| 350° F. (177° C.) bake | no nitrogen detected |
| 400° F. (204° C.) bake | no nitrogen detected |

I claim:
1. A curable resinous composition comprising:
   (A) a polyamine resin containing primary and/or secondary amino groups, said resin being stable under curing conditions; and
   (B) a Michael adduct of an organic material containing alpha, beta-ethylenically unsaturated moieties in conjugation with carbonyl moieties reacted with primary and/or secondary amines, said Michael adduct being unstable under curing conditions;
said resinous composition being depositable on a substrate to form a film thereon which is curable at elevated temperatures.

2. The resinous composition of claim 1 in which a portion of the amine groups are converted to cationic salt groups.

3. The resinous composition of claim 2 which is dispersed in aqueous medium.

4. A curable resinous coating composition dispersible in aqueous medium with the aid of cationic salt groups comprising as the resinous binder:
   (A) a polyamine resin containing primary and/or secondary amino groups, said resin being stable under curing conditions; and
   (B) a Michael adduct of an organic material containing alpha, beta-ethylenically unsaturated moieties in conjugation with carbonyl moieties reacted with primary and/or secondary amines, said Michael adduct being unstable under curing conditions;
said resinous binder being neutralized with acid to provide said cationic salt groups and being electrodepositable on a substrate to form a film thereon which is curable at elevated temperatures.

5. The resinous compositions of claims 1 or 4 in which the polyamine resin is a poly(amine-amide) having a terminal primary amine group.

6. The resinous compositions of claims 1 or 4 in which the polyamine resin is the reaction product of an epoxy-containing resinous material and a primary amine.

7. The resinous composition of claims 1 or 4 in which the polyamine resin is the reaction product of an epoxy-containing resinous material and a polyamine containing ketimine-blocked primary amine groups.

8. The resinous compositions of claims 1 or 4 in which (B) is formed from reacting an organic polyol with acrylic or methacrylic acid followed by reaction with a primary and/or secondary amine.

9. The resinous composition of claims 1 or 4 in which (B) is formed from reacting an epoxy-containing resinous material with acrylic or methacrylic acid followed by reaction with a primary and/or secondary amine.

10. The resinous compositions of claims 1 or 4 in which (B) is formed from reacting a polymeric polyol with an N-alkoxymethyl-containing acrylamide or methacrylamide followed by reaction with a primary and/or secondary amine.

11. A curable resinous composition comprising a polyamine resin containing:
   (A) primary and/or secondary amino groups which are non-volatile under curing conditions; and
   (B) amine groups which are formed by reacting alpha, beta-ethylenically unsaturated moieties in conjugation with carbonyl moieties with primary and/or secondary amines which are volatile under curing conditions;
said resinous composition being depositable on a substrate to form a film thereon which is curable at elevated temperatures.

12. The resinous composition of claim 11 in which a portion of the amine groups are converted to cationic salt groups.

13. The resinous composition of claim 12 which is dispersed in aqueous medium.

* * * * *